US008886741B2

(12) United States Patent
Li et al.

(10) Patent No.: US 8,886,741 B2
(45) Date of Patent: Nov. 11, 2014

(54) RECEIVE QUEUE MODELS TO REDUCE I/O CACHE CONSUMPTION

(75) Inventors: Yadong Li, Portland, OR (US); Linden Cornett, Portland, OR (US)

(73) Assignee: Intel Corporation, Santa Clara, CA (US)

(*) Notice: Subject to any disclaimer, the term of this patent is extended or adjusted under 35 U.S.C. 154(b) by 563 days.

(21) Appl. No.: 13/165,091

(22) Filed: Jun. 21, 2011

(65) Prior Publication Data

US 2012/0331083 A1    Dec. 27, 2012

(51) Int. Cl.
| | |
|---|---|
| G06F 15/167 | (2006.01) |
| G06F 15/78 | (2006.01) |
| G06F 5/00 | (2006.01) |
| G06F 13/28 | (2006.01) |
| G06F 12/08 | (2006.01) |

(52) U.S. Cl.
CPC ........ G06F 15/781 (2013.01); *G06F 2212/303* (2013.01); *G06F 5/00* (2013.01); *G06F 13/28* (2013.01); *G06F 12/0802* (2013.01)
USPC ............... 709/212; 709/234; 710/22; 710/52; 370/412

(58) Field of Classification Search
USPC .................. 709/208–219, 231–236; 358/448
See application file for complete search history.

(56) References Cited

U.S. PATENT DOCUMENTS

| | | | | |
|---|---|---|---|---|
| 5,613,162 A | * | 3/1997 | Kabenjian | 710/22 |
| 6,023,233 A | * | 2/2000 | Craven et al. | 341/51 |
| 6,112,267 A | * | 8/2000 | McCormack et al. | 710/52 |
| 6,381,661 B1 | * | 4/2002 | Messerly et al. | 710/63 |
| 6,738,371 B1 | * | 5/2004 | Ayres | 370/352 |
| 8,059,671 B2 | * | 11/2011 | Naven et al. | 370/416 |
| 2003/0128384 A1 | * | 7/2003 | Nelson et al. | 358/1.15 |
| 2003/0163660 A1 | * | 8/2003 | Lam | 711/170 |
| 2003/0231593 A1 | * | 12/2003 | Bauman et al. | 370/235 |
| 2005/0063315 A1 | * | 3/2005 | Chen et al. | 370/252 |
| 2006/0161733 A1 | * | 7/2006 | Beckett et al. | 711/118 |
| 2009/0103561 A1 | * | 4/2009 | Qi et al. | 370/468 |
| 2009/0181663 A1 | * | 7/2009 | Hu et al. | 455/422.1 |
| 2011/0125936 A1 | * | 5/2011 | Malleth et al. | 710/26 |

* cited by examiner

*Primary Examiner* — Abdullahi Salad
(74) *Attorney, Agent, or Firm* — Grossman, Tucker, Perreault & Pfleger, PLLC

(57) ABSTRACT

A method according to one embodiment includes the operations of configuring a primary receive queue to designate a first plurality of buffers; configuring a secondary receive queue to designate a second plurality of buffers, wherein said primary receive queue is sized to accommodate a first network traffic data rate and said secondary receive queue is sized to provide additional accommodation for burst network traffic data rates; selecting a buffer from said primary receive queue, if said primary receive queue has buffers available, otherwise selecting a buffer from said secondary receive queue; transferring data from a network controller to said selected buffer; indicating that said transferring to said selected buffer is complete; reading said data from said selected buffer; and returning said selected buffer, after said reading is complete, to said primary receive queue if said primary receive queue has space available for the selected buffer, otherwise returning said selected buffer to said secondary receive queue.

20 Claims, 4 Drawing Sheets

RECEIVE QUEUE MODELS TO REDUCE I/O CACHE CONSUMPTION

FIELD

The disclosure relates to direct memory access from devices to I/O cache and, more particularly, to receive queue models that reduce I/O cache consumption.

BACKGROUND

As network speeds increase, I/O devices with direct cache access are capable of pushing data into CPU cache memory at rates that can exceed the cache memory capacities typically available. Additionally, network device drivers often need to provide large numbers of receive buffers to handle conditions such as burst network traffic or delays in the return of buffers from application software higher in the O/S network stack.

This large number of receive buffers represents a large memory consumption, which can result in a large cache memory consumption under these conditions. Since cache memory is a limited system resource, having a large cache consumption can result in an increased number of cache line evictions where the receive buffers get mapped out of cache memory back into system memory. This can slow down the data transfer process which may result in performance degradation.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides receive queue modeling techniques that may reduce the cache memory consumption of an I/O device by reducing, on average, the number of receive buffers in use at a given time, which increases the probability that those receive buffers will be mapped into cache memory, rather than system memory. The techniques also provide a large number of receive buffers to handle burst traffic conditions. This results in faster and more efficient data transfers from the network controller to a host system. These receive queue modeling techniques can be used to particular advantage with I/O devices having Direct Memory Access (DMA) to cache memory.

Figure 1:
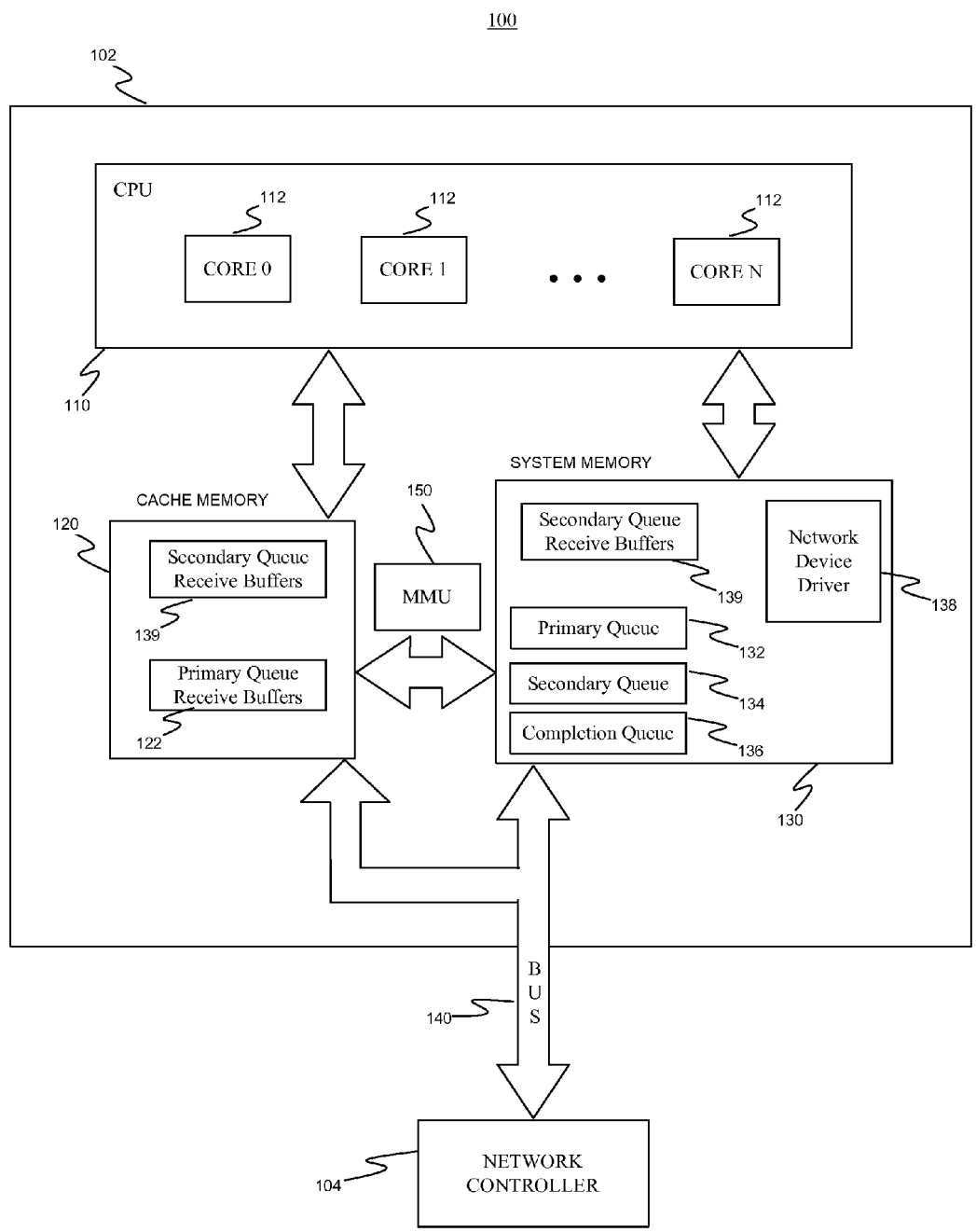
FIG. 1 illustrates one exemplary system embodiment.

FIG. 1 illustrates one exemplary system embodiment consistent with the present disclosure. System 100 of this embodiment generally includes a host system 102 and a network controller 104 in communication with the host system 102. The host system 102 of this embodiment includes a host processor (CPU) 110, cache memory 120, system memory 130 and a Memory Management Unit (MMU) 150. The CPU 110 may include at least one core processing unit 112 (hereinafter "core"), generally labeled Core 0, Core 1, . . . Core N. A "core" may comprise a physical processing unit and may be a logical and/or physical subsection of CPU 110.

System memory 130 may host operating system code, including for example an operating system network stack and a network controller device driver 138 which, when executed, is configured to control, at least in part, the operation of the network controller 104, as will be explained in greater detail below. System memory 130 may also store a primary receive queue 132, a secondary receive queue 134 and a completion queue 136, the operations of which will also be explained below in connection with the description of FIG. 2. Secondary queue receive buffers 139, which are data buffers associated with the secondary receive queue 134 may also reside in system memory 130.

Receive data buffers may also reside in cache memory 120. Primary queue receive buffers 122 are data buffers associated with the primary queue. These primary queue receive buffers 122 may be mapped into the cache memory 120 from system memory 130 via the MMU 150. Secondary queue receive buffers 139 may also reside in cache memory 120, although this is less likely on average.

Cache memory 120 generally provides faster read and write access than system memory 130. Cache memory 120, however, is generally smaller than system memory 130 and is therefore a scarce resource that is managed or rationed to maximize effectiveness. MMU 150 attempts to map portions of system memory 130 that are in frequent use into cache memory 120. This mapping is a dynamic process that continuously tracks the changing patterns of system memory 130 usage. If a system process can limit its memory usage to a smaller size it can increase the probability of that memory space being mapped into a portion of cache memory 120 and thereby benefit from the associated increase in speed and performance. This principle applies, in particular, to the process of data transfer from the network controller 104 to the host system 102.

Receive data may be transferred directly from the network controller 104 via bus 140 using DMA into either system memory 130 or cache memory 120. Secondary queue receive buffers 139 are statistically more likely to be transferred into system memory 130, while primary queue receive buffers 122 are statistically more likely to be transferred into cache memory 120, although there is no guarantee that buffers from either queue 139, 122 may not be transferred into either memory 130, 120. Bus 140 may be a Peripheral Component Interconnect Express (PCIe) bus or other suitable bus. The network controller 104 may be a 40 GbE or 100 GbE Ethernet controller with Direct Memory Access (DMA) to cache memory (also referred to as Direct Cache Access (DCA) or Direct Input/Output (DIO) support in some embodiments). DMA data transfers are advantageous because they relieve the CPU 110 of some of the burdens of the memory transfer.

Figure 2:
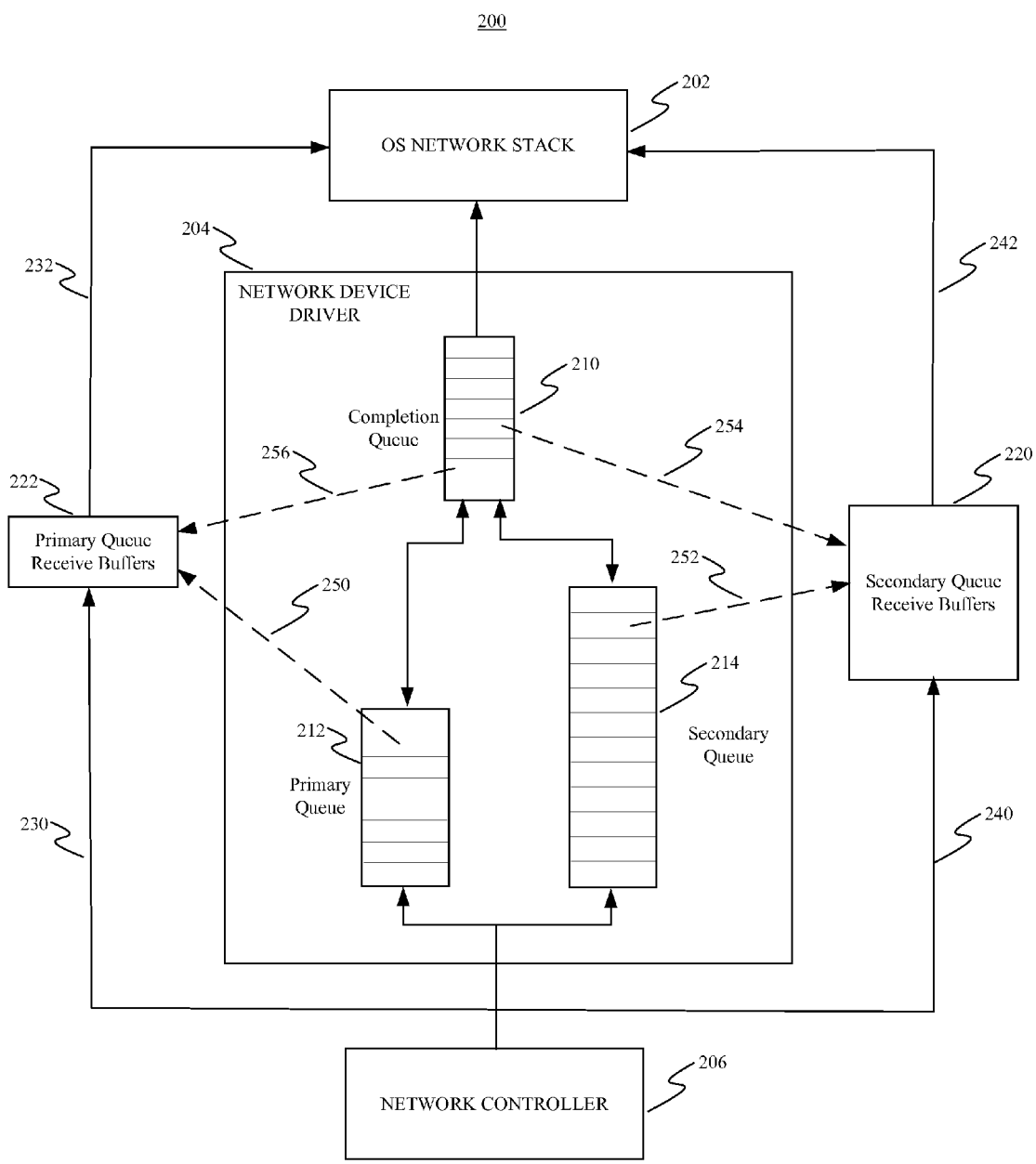
FIG. 2 illustrates a functional block diagram of one exemplary embodiment of queue management and data flow.

FIG. 2 illustrates a functional block diagram of one exemplary embodiment of queue management and data flow consistent with the present disclosure. Data arriving from the network controller 206, typically in the form of packets, needs to be buffered before processing by the O/S network stack 202 up to higher-level applications, since the network controller 206 data rate and the network stack 202 processing data rate may vary independently of one another. This buffering function is performed by the network device driver 204 (typically software) and the network controller 206 (typically hardware) working in combination as will be described in greater detail below.

Optimal selection of the number and size of these data buffers involves a tradeoff. Reducing buffer space is desirable because this decreases the memory consumption and increases the probability that the buffers will be mapped into cache 120. Using a smaller buffer space, however, increases the risk of running out of buffers during periods of higher than normal network data traffic rates (e.g., burst conditions) or from delays in buffer returns from the network stack 202. If buffers are unavailable when needed, data packets from the network will be lost, likely requiring retransmission, which is inefficient.

An embodiment of a buffer queue management model consistent with the present disclosure addresses this problem by providing a primary receive queue 212, a secondary (or backup) receive queue 214 and a completion queue 210. The primary receive queue 212 provides a list of data buffers referred to as primary queue receive buffers 222. The secondary receive queue 214 provides a list of data buffers referred to as secondary queue receive buffers 220. Primary queue receive buffers 222 and secondary queue receive buffers 220 are available for the network controller 206 to fill with data from incoming packets as indicated on paths 230 and 240 respectively. The primary receive queue 212 is sized to meet the typical expected working requirements while the secondary receive queue 214 is sized to meet the requirements of burst network traffic conditions and longer than normal delays in buffer returns from applications. In some embodiments the primary queue 212 may be sized to approximately 64 entries while the secondary queue 214 may be sized to the range of 512 to 1024 entries.

The network controller 206 will use empty data buffers designated by the primary receive queue 212, by buffer address pointer 250, whenever buffers are available in that queue. If no buffers are available from the primary receive queue 212 then the network controller 206 will use empty data buffers designated by the secondary receive queue 214, by buffer address pointer 252. The network controller 206 will then transfer data into these buffers 222 or 220 using, for example, DMA techniques. By preferentially using data buffers 222 from the smaller primary queue 212 in this manner, the memory consumption is reduced and the probability that the buffers 222 will be mapped to cache memory 120 is increased. Having the secondary queue 214 available as a backup, however, ensures that data buffers 220 will be available to handle the requirements of burst network traffic so that packets are not dropped, at the expense of decreasing the probability that buffers will be mapped into the cache memory 120.

After the data has been transferred to the buffer in 222 or 220, the network controller 206 posts that data buffer to a completion queue 210, using buffer address pointers 256 or 254 respectively, indicating that the buffer is available to the network device driver 204. The network device driver 204 then processes that buffer by passing it along path 232 or 242 to the network stack 202, which consumes the data in the buffer and returns the buffer to the network device driver 204. The network device driver 204 then posts the, now empty, data buffer to the primary receive queue 212, using buffer address pointer 250, if space is available in the primary receive queue 212, otherwise it posts the buffer to the secondary receive queue 214, using buffer address pointer 252. Here again, preferential use of the smaller primary receive queue 212 reduces the memory consumption of buffers in active use and increases the probability that those buffers will be mapped to the cache memory 120.

Transfer control mechanisms are employed on the primary 212, secondary 214 and completion 210 queues to prevent overflow or other error conditions as will be described in greater detail below.

Figure 3:
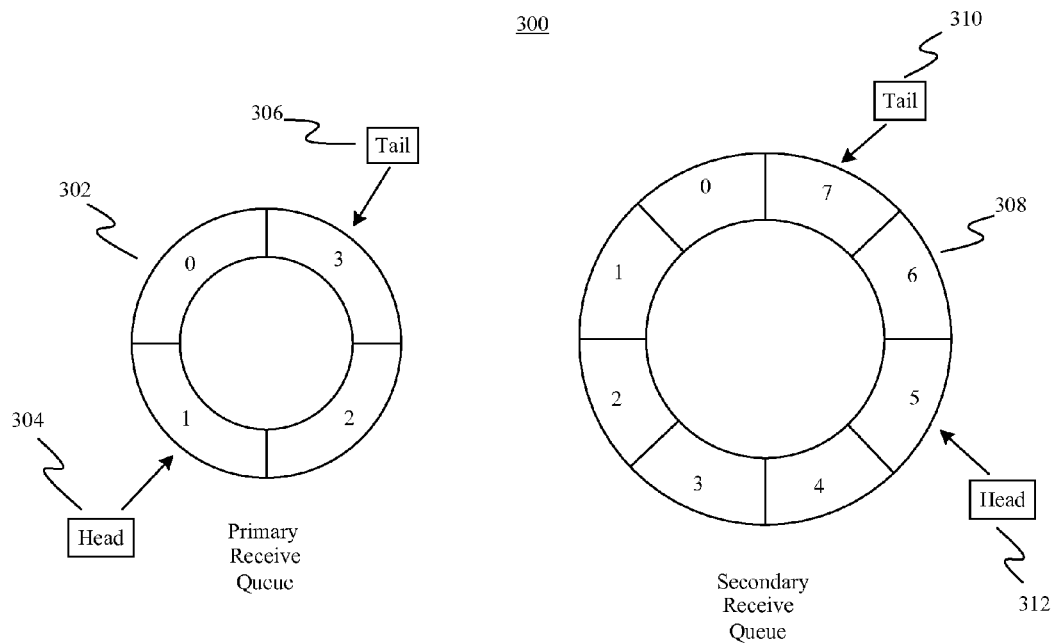
FIG. 3 illustrates an exemplary embodiment of receive queues.

FIG. 3 illustrates an exemplary embodiment of receive queues consistent with the present disclosure. Primary receive queue 302 and secondary receive queue 308 may be implemented as circular (e.g., ring) buffers. In the figure, primary queue 302 is shown as having only four entries while secondary queue 308 is shown as having only 8 entries for simplicity. In practice the queues 302, 308 may be much larger, for example, on the order of 64 and 1024 respectively. In operation, the network controller 206 pulls a data buffer, to be filled, from the primary queue 302 or secondary queue 308 at the entry specified by the head pointer 304, 312 respectively, and then increments that head pointer 304,312. Later, after the data buffer has been processed and is ready to be re-filled, the network device driver 204 returns the data buffer to the primary queue 302 or secondary queue 308 at the entry specified by the tail pointer 306, 310 respectively and then increments that tail pointer 306, 310.

Before returning the data buffer to the queue 302, 308, however, the network device driver 204 checks that the incremented tail pointer 306, 310 will not pass the head pointer 304, 312, which would cause an overflow of the queue 302, 308. Such an overflow condition signals to the driver 204 that the queue 302, 308 is full and that there is no space available for the data buffer to be returned to that queue 302, 308. If this occurs when writing to the primary queue 302, the driver switches to the secondary queue 308. Generally, the secondary queue 308 is sized such that an overflow condition will not occur, otherwise data transfer and processing may be interrupted and incoming packets dropped.

Similarly, before pulling a data buffer from the queue 302, 308, the network controller 206 checks that the incremented head pointer 304, 312 will not pass the tail pointer 306, 310, which would indicate that there are no available data buffers in that queue 302, 308. If this occurs on the primary queue 302, the controller 206 switches to the secondary queue 308 to find an available buffer. Again, generally, the secondary queue 308 is sized such that free buffers will always be available, otherwise data transfer and processing may be interrupted and incoming packets dropped.

In some embodiments the primary 302 and secondary 308 receive queues will share an on-die cache.

In some embodiments buffers will be posted and pulled in multiples of a "fetch" size (e.g., blocks of four or eight for example) for efficiency reasons.

Figure 4:
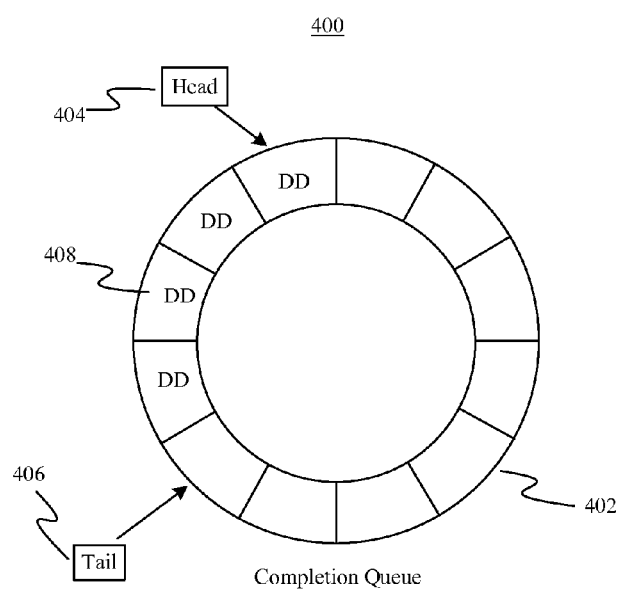
FIG. 4 illustrates an exemplary embodiment of completion queues.

FIG. 4 illustrates an exemplary embodiment of a completion queue consistent with the present disclosure. Completion queue 402 may also be implemented as a circular (e.g., ring) buffer. In the figure, completion queue 402 is shown as having only twelve entries for simplicity. In practice the queue 402 may be larger, and may be sized such that an overflow will not occur. In some embodiments the completion queue 402 may be sized to approximately 512 entries. In operation, the network controller 206 posts the recently filled data buffer to the completion queue 402 at the entry specified by the tail pointer 406, and then increments the tail pointer 406.

Before posting the data buffer to the completion queue 402, however, the network controller 206 checks that the incremented tail pointer 406 will not pass the head pointer 404, which would cause an overflow of the completion queue 402. Such an overflow condition signals to the controller that the queue 402 is full and that there is no space available for the data buffer to be posted to the completion queue 402. Generally, the completion queue 402 is sized such that an overflow condition will not occur, otherwise data transfer and processing may be interrupted and incoming packets dropped.

Similarly, the network device driver 204 pulls a filled data buffer from the completion queue 402 at the head pointer 404 for processing and increments the head pointer 404 when processing of that buffer is completed which allows the network controller 206 to advance the tail pointer 406 as needed.

The completion queue 402 may also provide a DMA Done bit (DD) 408 for each entry, which is toggled by the network controller 206 with each cycle through the queue 402. This DD bit 408 signals to the network device driver 204 that a new entry has been written by the network controller 206, and the toggling by the network controller 206 eliminates the need for the device driver 204 to clear the DD bit 408. This is advantageous since, in some embodiments, the completion queue 402 may be write-only by the network controller 206 and read-only by the device driver 204. The driver 204 may process all possible completion queue 402 entries while the DD bit 408 matches a current DD flag value maintained by the device driver 204.

In some embodiments the entries in the queues 302, 308 402 may be descriptors, which may comprise addresses to software-defined tags or data structures that in turn comprise the address of the designated buffers and any other information such as the DD bits 408.

In some embodiments multiple completion queues 402 may be employed and each core may be associated with a different completion queue.

Figure 5:
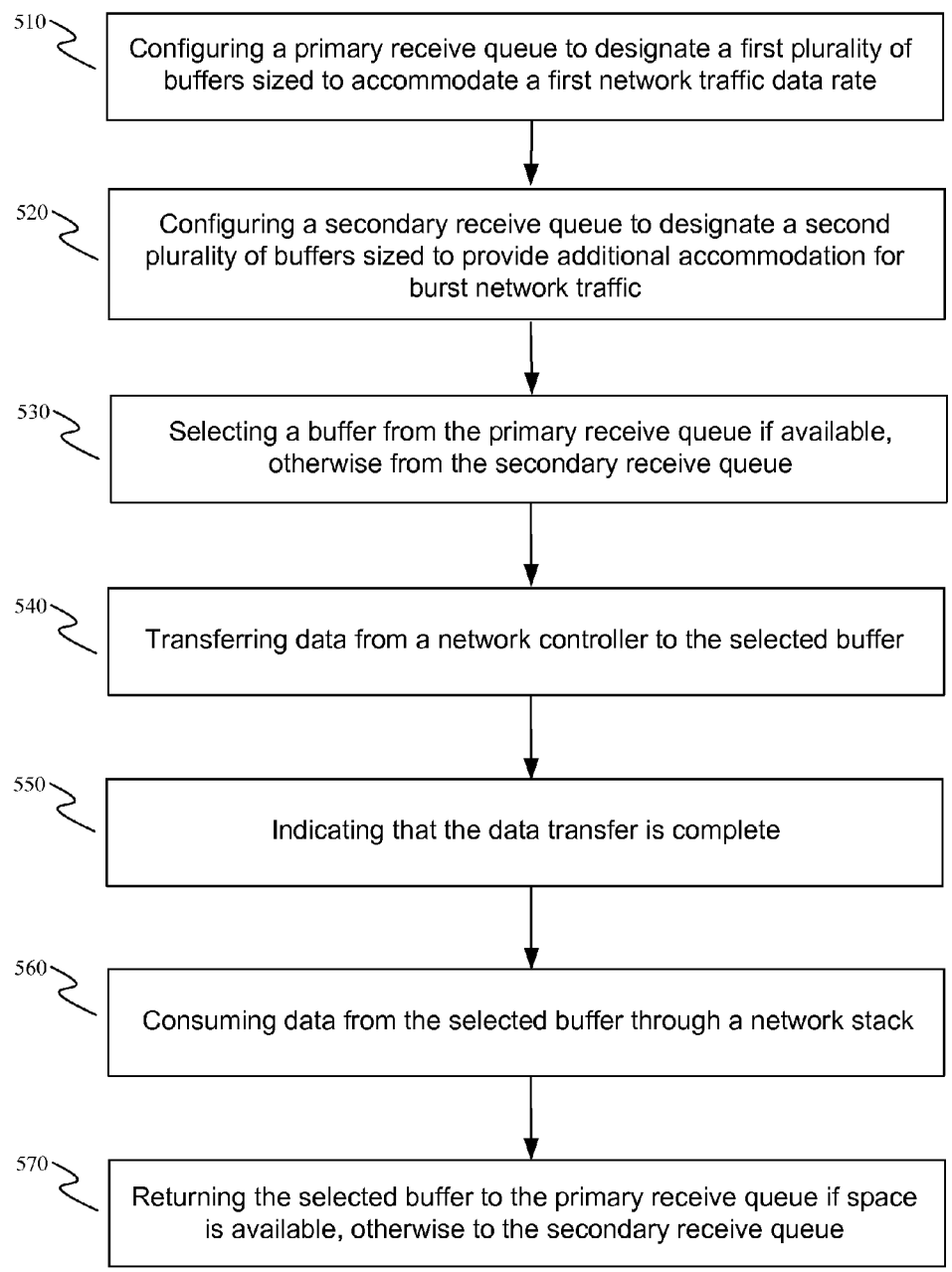
FIG. 5 illustrates a flowchart of exemplary operations.

FIG. 5 illustrates a flowchart of exemplary operations consistent with the present disclosure. The operations illustrated in this embodiment may be performed by circuitry and/or software modules associated with a network controller 104, or such operations may be performed by circuitry and/or software modules associated with a host system 102 (or other components), or a combination thereof.

At operation 510 a primary receive queue is configured to designate a plurality of buffers sized to accommodate a first network traffic data rate. At operation 520 a secondary receive queue is configured to designate a plurality of buffers sized to provide additional accommodation for burst network traffic. In some embodiments, the primary and secondary receive queues may be allocated by the network device driver. In some embodiments, the secondary receive queue may be larger than the primary receive queue. At operation 530 a buffer is selected from the primary receive queue if one is available, otherwise the buffer is selected from the secondary receive queue. In some embodiments, the buffer may be selected by the network controller. Availability may be determined by relative positions of a head pointer and a tail pointer for each of the queues. At operation 540 data is transferred from a network controller to the selected buffer. In some embodiments the data transfer may be a DMA transfer. At operation 550 an indication is given that the transfer is complete. This indication may be accomplished through the completion queue as described previously. At operation 560 data from the selected buffer is consumed through an operating system network stack. This may be accomplished by the network device driver removing the buffer from the completion queue and passing it on to the network stack. At operation 570 the selected buffer is returned to the primary receive queue if space is available, otherwise the selected buffer is returned to the secondary receive queue. The returned buffer is then available to the network controller to be re-filled with new data.

The operations described herein increase the probability that the buffers being selected, to receive and process incoming data, will be mapped into cache memory 120 since they are preferentially selected from the smaller primary receive queue 212 which comprises a smaller pool of buffers 222 which take up a smaller combined memory size.

The operation described above may also be performed in the context of an Interrupt Service Routine (ISR), which may be triggered on a DMA completion. On some operating systems, the ISR schedules a Deferred Procedure Call (DPC). The DPC determines the appropriate completion queue 402 to be processed based on an interrupt-to-queue mapping, in embodiments where there are a plurality of completion queues 402 associated with different cores 112. The network device driver 204 then reads an entry from the appropriate completion queue 210 based on the current completion queue head pointer 404. If the DD bit 408 value matches the current DD flag (which is toggled by the network controller 206 on every rotation through the circular queue) then the entry is valid and has just been filled by the network controller 206. The driver 204 then processes the associated data buffer and increments the head pointer 404 when the processing is complete. The driver processes all possible completion queue 402 entries until the DD bit 408 value of an entry fails to match the current DD flag. The network stack 202, which consumes the data buffers during processing, returns those data buffers to the device driver 204 which then posts them back to the primary receive queue 212 if space is available or the secondary receive queue 214 at the position indicated by the appropriate queue tail pointer 306, 310. The driver 204 determines if space is available based on the position of the receive queue head pointer 304, 312 relative to the tail pointer 306, 310. The driver then updates the receive queue tail pointer 306, 310.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor of FIG. 1) and/or programmable circuitry such as the network controller circuitry. Thus, it is intended that operations according to the methods described herein may be distributed across a plurality of physical devices, such as processing structures at several different physical locations. Of course, the operations described herein as attributable to the host system and the network controller could be performed by a storage medium, on one or the other, having instructions that when executed by one or more processors perform the methods. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

"Circuitry", as used in any embodiment herein, may comprise, for example, singly or in any combination, hardwired circuitry, programmable circuitry, state machine circuitry, and/or firmware that stores instructions executed by programmable circuitry.

What is claimed is:

1. A method, comprising:
   configuring a primary receive queue to designate a first plurality of buffers;
   configuring a secondary receive queue to designate a second plurality of buffers, wherein said primary receive queue is sized to accommodate a first network traffic data rate and said secondary receive queue is sized to provide additional accommodation for burst network traffic data rates;
   selecting a buffer from said primary receive queue, if said primary receive queue has buffers available, otherwise selecting a buffer from said secondary receive queue;
   transferring data from a network controller to said selected buffer;
   indicating that said transferring to said selected buffer is complete;
   reading said data from said selected buffer; and
   returning said selected buffer, after said reading is complete, to said primary receive queue if said primary receive queue has space available for the selected buffer, otherwise returning said selected buffer to said secondary receive queue.

2. The method of claim 1, wherein said primary and secondary receive queues are implemented as circular buffers comprising a plurality of descriptors, wherein said descriptors link to buffers in said first and second plurality of buffers and allow a network driver and said network controller to access said buffers in said first and second plurality of buffers.

3. The method of claim 2, wherein said circular buffers further comprise:
   a head pointer indicating a first location in said circular buffer at which said network controller removes a descriptor corresponding to said selected buffer; and
   a tail pointer indicating a second location in said circular buffer at which said network driver inserts a descriptor corresponding to said returned buffer.

4. The method of claim 3, wherein said indicating further comprises:
   providing a completion queue configured to receive said descriptors; and
   inserting said descriptor corresponding to said selected buffer into said completion queue by said network controller after said transfer is complete.

5. The method of claim 4, wherein said reading further comprises:
   removing said descriptor corresponding to said selected buffer from said completion queue by said network driver; and
   consuming said selected buffer through a network stack for processing.

6. The method of claim 3, wherein one or more of said completion queues is associated with each of a plurality of CPU cores.

7. The method of claim 1, wherein said secondary receive queue is larger than said primary receive queue.

8. The method of claim 1, wherein said transferring is a direct memory access (DMA) transfer from said network controller to said selected buffer.

9. The method of claim 1, wherein preferential selection of buffers from said primary receive queue increases a probability that said selected buffer resides in a cache memory.

10. A system comprising, one or more non-transitory storage mediums having stored thereon, individually or in combination, instructions that when executed by one or more processors result in the following operations comprising:
    configuring a primary receive queue to designate a first plurality of buffers;
    configuring a secondary receive queue to designate a second plurality of buffers, wherein said primary receive queue is sized to accommodate a first network traffic data rate and said secondary receive queue is sized to provide additional accommodation for burst network traffic data rates;
    selecting a buffer from said primary receive queue, if said primary receive queue has buffers available, otherwise selecting a buffer from said secondary receive queue;
    transferring data from a network controller to said selected buffer;
    indicating that said transferring to said selected buffer is complete;
    reading said data from said selected buffer; and
    returning said selected buffer, after said reading is complete, to said primary receive queue if said primary receive queue has space available for the selected buffer, otherwise returning said selected buffer to said secondary receive queue.

11. The system of claim 10, wherein said primary and secondary receive queues are implemented as circular buffers comprising a plurality of descriptors, wherein said descriptors link to buffers in said first and second plurality of buffers and allow a network driver and said network controller to access said buffers in said first and second plurality of buffers.

12. The system of claim 11, wherein said circular buffers further comprise:
    a head pointer indicating a first location in said circular buffer at which said network controller removes a descriptor corresponding to said selected buffer; and
    a tail pointer indicating a second location in said circular buffer at which said network driver inserts a descriptor corresponding to said returned buffer.

13. The system of claim 12, wherein the instructions that when executed by one or more of the processors result in the following additional operations comprising:
    providing a completion queue configured to receive said descriptors; and
    inserting said descriptor corresponding to said selected buffer into said completion queue by said network controller after said transfer is complete.

14. The system of claim 13, wherein said reading further comprises:
    removing said descriptor corresponding to said selected buffer from said completion queue by said network driver; and
    consuming said selected buffer through a network stack for processing.

15. The system of claim 12, wherein one or more of said completion queues is associated with each of a plurality of CPU cores.

16. The system of claim 10, wherein said secondary receive queue is larger than said primary receive queue.

17. The system of claim 10, wherein said transferring is a direct memory access (DMA) transfer from said network controller to said selected buffer.

18. The system of claim 10, wherein said primary receive queue and said secondary receive queue are implemented in a shared on-die cache.

19. A network controller, comprising:
- media access control (MAC) circuitry configured to:
    - select a buffer from a primary receive queue on a host system, if said primary receive queue has buffers available, otherwise select a buffer from a secondary receive queue on said host system, wherein said primary receive queue is sized to accommodate a first network traffic data rate and said secondary receive queue is sized to provide additional accommodation for burst network traffic data rates;
    - transfer data to said selected buffer; and
    - indicate to said host system that said transferring is complete by posting said selected buffer to a completion queue on said host system; and
- network device driver configured to:
    - read said data from said selected buffer; and
    - return said selected buffer, after said reading is complete, to said primary receive queue if said primary receive queue has space available for the selected buffer, otherwise returning said selected buffer to said secondary receive queue.

20. The network controller of claim 19, wherein said transfer is a direct memory access (DMA) transfer from said network controller to said selected buffer.

\* \* \* \* \*

UNITED STATES PATENT AND TRADEMARK OFFICE
CERTIFICATE OF CORRECTION

| | | |
|---|---|---|
| PATENT NO. | : 8,886,741 B2 | Page 1 of 1 |
| APPLICATION NO. | : 13/165091 | |
| DATED | : November 11, 2014 | |
| INVENTOR(S) | : Yadong Li et al. | |

It is certified that error appears in the above-identified patent and that said Letters Patent is hereby corrected as shown below:

In the Drawings

On sheet 1 of 4, in Figure 1, Ref. Numeral 139, line 1, delete "Sccondary Qucuc" and insert -- Secondary Queue --, therefor.

On sheet 1 of 4, in Figure 1, Ref. Numeral 138, line 1, delete "Nctwork" and insert -- Network --, therefor.

On sheet 1 of 4, in Figure 1, Ref. Numeral 132, line 1, delete "Qucuc" and insert -- Queue --, therefor.

On sheet 1 of 4, in Figure 1, Ref. Numeral 136, line 1, delete "Complction Qucuc" and insert -- Completion Queue --, therefor.

On sheet 2 of 4, in Figure 2, Ref. Numeral 222, line 1, delete "Qucuc" and insert -- Queue --, therefor.

On sheet 2 of 4, in Figure 2, Adjacent to Ref. Numeral 256, line 2, delete "Qucuc" and insert -- Queue --, therefor.

On sheet 2 of 4, in Figure 2, Ref. Numeral 220, line 1, delete "Sccondary Qucuc" and insert -- Secondary Queue --, therefor.

On sheet 3 of 4, in Figure 3, line 8, delete "Qucuc" and insert -- Queue --, therefor.

On sheet 3 of 4, in Figure 3, Ref. Numeral 312, line 1, delete "liead" and insert -- Head --, therefor.

On sheet 3 of 4, in Figure 4, Ref. Numeral 404, line 1, delete "Hcad" and insert -- Head --, therefor.

Signed and Sealed this
Tenth Day of March, 2015

Michelle K. Lee
*Deputy Director of the United States Patent and Trademark Office*